United States Patent [19]

Fallows et al.

[11] 4,374,208

[45] Feb. 15, 1983

[54] POLYETHER-URETHANE FOAMS

[75] Inventors: John C. J. Fallows; Richard G. Harvey, both of High Wycombe, England

[73] Assignee: Dunlop Limited, London, England

[21] Appl. No.: 324,418

[22] Filed: Nov. 24, 1981

Related U.S. Application Data

[63] Continuation of Ser. No. 233,116, Feb. 10, 1981, abandoned.

[30] Foreign Application Priority Data

Feb. 20, 1980 [GB] United Kingdom ............... 8005791

[51] Int. Cl.³ ............................................. C08G 18/14
[52] U.S. Cl. .................................................... 521/109
[58] Field of Search ........................................ 521/109

[56] References Cited

U.S. PATENT DOCUMENTS 4,197,372 4/1980 Hostettler ........................... 521/109
4,237,182 12/1980 Fulmer et al. ...................... 521/109

FOREIGN PATENT DOCUMENTS 2448216 4/1975 Fed. Rep. of Germany .
4218356 9/1967 Japan .

*Primary Examiner*—Maurice J. Welsh
*Attorney, Agent, or Firm*—Stevens, Davis, Miller & Mosher

[57] ABSTRACT

A method for the production of a polyether-urethane foam includes the step of incorporating into the foam-forming reaction mixture a degradation product of a starch and/or an acetyl, hydroxypropyl or oxidized derivative of a starch. This additive can be used to substitute up to 80% by weight of the polymeric polyol on which the foam formulation is based. The foams can be rigid, semi-rigid, semi-flexible or flexible and their physical and dynamic properties compare favorably with those of foams lacking the starch additive, while the production costs of the foams are significantly lowered.

13 Claims, No Drawings

POLYETHER-URETHANE FOAMS

This is a continuation of application Ser. No. 233,116 filed Feb. 10, 1981, now abandoned.

This invention relates to a process for the production of polyether-urethane foams and to foams obtained thereby.

Polyether-urethane foams, whether produced by means of a "one-shot" or a "prepolymer" process, are well known. Both processes consist essentially of the reaction of a polymeric polyol with an organic polyisocyanate, in the presence of a blowing agent, one or more catalysts and one or more other additives (e.g. surface active agents) such as are customarily used in foam formulations.

It has been proposed, in an attempt to offset the rapidly-increasing cost of the foam-forming materials (particularly that of the polyols) to replace at least some of the polyol in the foam formulation with a filler material. An example of such a filler material which has been proposed is starch (particularly maize starch). Whilst it is known to produce foams containing maize starch per se, it has been found that only a relatively limited amount of starch can be incorporated into a polyether-urethane foam if the physical properties of the foam are not to be reduced below an acceptable minimum level. Furthermore, strict control over the remaining ingredients (especially surface active agents) has been found necessary for satisfactory foams to be produced. Finally, it has not hitherto proved possible to make, at economic cost, polyether-urethane foams containing starch and having a wide range of hardness properties.

We have now found that a starch degradation product and/or a derivative of a starch having a degree of substitution less than 0.25, can be incorporated into a polyether-urethane foam-forming reaction mixture and a wide range of foams obtained by means of a one-shot process.

Accordingly, the present invention provides a one-shot process for the production of a polyether-urethane foam by reacting in a foam-forming reaction mixture:

(a) a polyoxyalkylene polyol containing at least two hydroxyl groups per molecule, from 0 to 20% by weight polyoxyethylene groups and less than 20 mole % primary hydroxyl groups and having a molecular weight in the range 1500 to 10000;

(b) a tolylene di-isocyanate;

(c) a polyoxyalkylene/polysiloxane block copolymer of the type used in conventional (as opposed to high-resilience) urethane foam formulations;

(d) a blowing agent, and (e) one or more catalysts, in which the reaction mixture also contains a material containing up to 15% by weight of water, said material being a material selected from the group consisting of degradation products of a starch AND derivatives of a starch wherein the degree of substitution of the starch is less than 0.25.

The present invention also provides a polyether-urethane foam made by the process described in the immediately-preceding paragraph.

The polyoxyalkylene polyol is preferably one containing less than 10 mole % primary hydroxyl groups, e.g. a polyoxypropylene/polyoxyethylene triol having a molecular weight of about 3500 and a hydroxyl number of about 48. One such polyol is available from Dow Chemical Company as CP 3322.

The tolylene diisocyanate is preferably a mixture of 2,4- and 2,6-tolylene diisocyanate in a ratio of 80:20 by weight (80/20 T.D.I.). Alternatively, 65/35, T.D.I. may be used. A mixture of 80/20 T.D.I. and 65/35 T.D.I. may also be used.

The silicone surface active agent is, as described hereinabove, one which is used in conventional (i.e. other than high-resilience) foam formulations, e.g. one or more polyalkylene oxide/polysiloxane copolymers.

The blowing agent is preferably water (the addition of which to the formulation causes evolution of carbon dioxide), either used as the sole blowing agent or in combination with halogenated hydrocarbons such as trichlorofluoromethane or methylene dichloride.

The catalysts can be any of those which are generally used in foam formulations, e.g. tertiary amines, including triethylene diamine, dimethyl-ethanolamine, bis(-dimethylaminoethyl) ether and N-alkyl-morpholines, and organo-metallic compounds such as stannous octoate and dibutyltindilaurate. Degradation products of starch which may be used in accordance with the present invention include the dextrins. Suitable starch derivatives include those obtained by acetylation, oxidation and hydroxypropylation. Of the various starch derivatives which may be used, the preferred one is the acetyl derivative. The preferred degree of substitution in the starch derivative is less than 0.10, e.g. 0.05.

The starch degradation products, and/or the starch derivatives can be used to substitute up to 80% by weight of the polyol.

The amount of starch degradation product and/or starch derivative incorporated into the foam formulation will determine whether the finished foam is to be rigid, semi-rigid, semi-flexible or flexible.

The present invention will be illustrated by way of the following examples:

EXAMPLE 1

A flexible foam was produced using a starch derivative according to the formulation shown in TABLE A (below):

TABLE A

| Notes v.i. | Ingredient | Amount (parts by weight) |
|---|---|---|
| (a) | Polyol | 95.65 |
| (b) | Polyisocyanate | 58.0 |
|  | Water | 4.15* |
|  | Stannous octoate | 0.27 |
| (c) | Amine catalyst | 0.22 |
| (d) | Surface active agent | 0.75 |
| (h) | Starch derivative | 5.0* |
|  | Pigment | 0.19 |

*These amounts take account of the fact that the starch derivative used contains 13% water.

Notes to TABLE A:

(a) A polyoxypropylene polyoxyethylene triol, available from Dow Chemical Company as VORANOL CP 3322. (VORANOL is a Registered Trade Mark).

(b) 80/20 T.D.I.

(c) Dimethylethanolamine, available from Lankro Chemical Company as PROPAMINE A. (PROPAMINE is a Registered Trade Mark).

(d) Available from Hythe Chemicals as Silicone L 546.

(h) An acetyl derivative of maize starch, available from C P C (U.K.) Limited as AMISOL 05374.

The physical properties of the foam of EXAMPLE 1 were compared with two "control" foams, CONTROL I without starch and CONTROL II using an unmodified maize starch. The results are shown in TABLE B (below):

TABLE B

| Property | CONTROL I | CONTROL II | Ex. 1 |
|---|---|---|---|
| Density (Kg/m³) | 21.8 | 22.1 | 22.0 |
| Hardness (N; 40% deflection) | 135 | 160 | 153 |
| Tensile strength (KP) | 150 | 108 | 101 |
| Elongation-at-break (%) | 265 | 165 | 200 |
| Porosity | 59 | 39 | 22 |
| 75% Compression set | 8.2 | 7.9 | 8.5 |

The results shown in TABLE B (above) demonstrate the improvement in elongation obtained by the use of a starch derivative.

EXAMPLE 2

A flexible foam was made using a low dextrose-equivalent glucose syrup produced by the enzymic hydrolysis of maize starch (Ex. 2). The physical properties of the foam were compared with those of a "control" foam (CONTROL III) produced using a standard unmodified maize starch. The formulations and properties are shown in TABLE C (below):

TABLE C (i) Formulations

| Notes v.i. | Ingredient | Amount (parts by weight) CONTROL III | Ex. 2 |
|---|---|---|---|
| (a) | Polyol | 95.65 | 96.2 |
| (b) | Polyisocyanate | 58.0 | 58.0 |
|  | Water | 4.15 | 3.6 |
|  | Stannous octoate | 0.25 | 0.25 |
| (c) | Amine catalyst | 0.20 | 0.20 |
| (d) | Surface active agent | 0.90 | 0.90 |
| (e) | Starch | 5.0 | — |
| (j) | Glucose syrup | — | 5.0 |

For explanation of (a) to (d), see TABLE A.

(j) A glucose syrup, available from C P C (U.K.) Limited as GLOBE SYRUP 01410.

(e) Maize Starch, available from C.P.C. (U.K.) Limited as GLOBE 03401.

(ii) Properties

| Property | CONTROL III | Ex. 2 |
|---|---|---|
| Density (Kg/m³) | 20.7 | 21.0 |
| Hardness (N: 40% deflection) | 173 | 177 |
| Tensile strength (KP) | 86 | 106 |
| Elongation-at-break (%) | 135 | 165 |
| 75% Compression set (%) | 7.1 | 8.7 |

EXAMPLE 3

A flexible foam was made from the formulation shown in TABLE D (below).

TABLE D

| Notes v.i. | Ingredient | Amount (parts by weight) |
|---|---|---|
| (a) | Polyol | 94.5 |
| (b) | Polyisocyanate | 37.3 |
|  | Water | 2.18 |
|  | Stannous octoate | 0.26 |
| (c) | Amine catalyst | 0.30 |
| (d) | Surface active agent | 0.80 |

TABLE D-continued

| Notes v.i. | Ingredient | Amount (parts by weight) |
|---|---|---|
| (h) | Starch derivative | 5.50 |

For explanation of (a) to (h), see TABLE A.

The foam was found to have the following properties:

| Density (Kg/m³) | 26.6 |
|---|---|
| Hardness (N: 40% indentation) | 120 |
| Tensile strength (KP) | 122 |
| Elongation-at-break (%) | 240 |
| 75% Compression set (%) | 10 |
| Porosity | 34 |

Having now described our invention what we claim is:

1. A one-shot process for the production of a polyetherurethane foam by reacting in a foam-forming reaction mixture:
   (a) a polyoxyalkylene polyol containing at least two hydroxy groups per molecule, from 0 to 20% by weight polyoxyethylene groups and less than 20 mole percent primary hydroxyl groups and having a molecular weight in the range 1500 to 10000;
   (b) a tolylene diisocyanate;
   (c) a polyoxyalkylene/polysiloxane block copolymer of the type used in conventional (as opposed to high-resilience) urethane foam formulations:
   (d) a blowing agent and
   (e) at least one catalyst, wherein the reaction mixture additionally contains at least one substance selected from the group consisting of degradation products of a starch and starch derivatives having a degree of substitution less than 0.25, said degradation products and said derivatives containing up to 15% by weight of water.

2. The process of claim 1, wherein the polyoxyalkylene polyol contains less than 10 mole percent primary hydroxyl groups.

3. The process of claim 1, wherein the tolylene diisocyanate is a mixture of 2,4- and 2,6-tolylene diisocyanate, the ratio by weight of said 2,4-2,6-isomers being a ratio selected from the group consisting of 80:20, 65:35 and combinations of said mixtures.

4. The process of claim 1, wherein the blowing agent is water.

5. The process of claim 1, wherein the blowing agent is a halogenated hydrocarbon selected from the group consisting of trichlorofluoromethane and methylene dichloride.

6. The process of claim 1, wherein the catalyst is a tertiary amine selected from the group consisting of triethylene diamine, dimethyl ethanolamine, bis(-dimethyl aminoethyl) ether and N-alkyl-morpholines.

7. The process of claim 1, wherein the catalyst is an organometallic compound selected from the group consisting of stannous octoate and dibutyl tin dilaurate.

8. The process of claim 1, wherein the starch degradation product is a dextrin.

9. The process of claim 1, wherein the starch derivative is selected from the group consisting of acetylated starches, oxidised starches and hydroxy-propylated starches.

10. The process of claim 1, wherein the starch derivative has a degree of substitution less than 0.10.

11. The process of claim 10, wherein the starch derivative has a degree of substitution of 0.05.

12. The process of claim 1, wherein said at least one substance selected from the group consisting of, degradation products of a starch and starch derivatives is used to substitute up to 80% by weight of said polyoxyalkylene polyol.

13. A polyether-urethane foam, said foam having been made by reacting in a foam-forming reaction mixture:
(a) a polyoxyalkylene polyol containing at least two hydroxy groups per molecule, from 0 to 20% by weight polyoxyethylene groups and less than 20 mole percent primary hydroxyl groups and having a molecular weight in the range 1500 to 10000;
(b) a tolylene diisocyanate;
(c) a polyoxyalkylene/polysiloxane block copolymer of the type used in conventional (as opposed to high-resilience) urethane foam formulations;
(d) a blowing agent and
(e) at least one catalyst, wherein the reaction mixture additionally contains at least one substance selected from the group consisting of degradation products of a starch and starch derivatives having a degree of substitution less than 0.25, said degradation products and said derivatives containing up to 15% by weight of water.

* * * * *